Oct. 20, 1959  V. E. BUEHRLE, JR., ET AL  2,909,250
AUTOMOBILE BRAKE SLACK ADJUSTING APPARATUS
Filed March 4, 1955  2 Sheets-Sheet 2
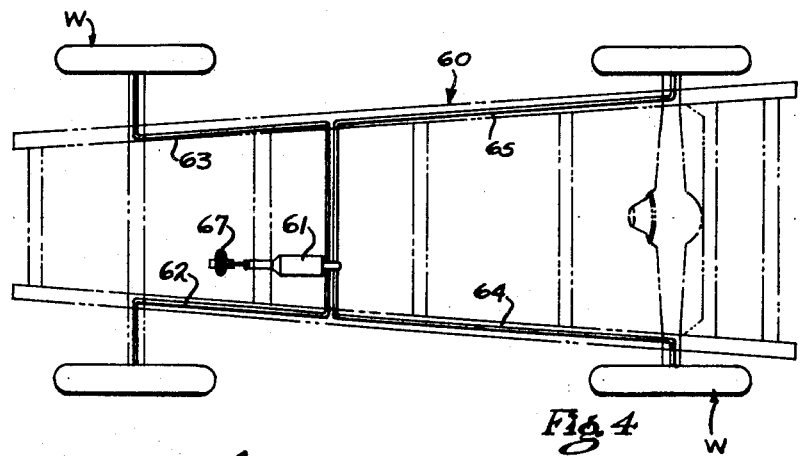
Fig. 4
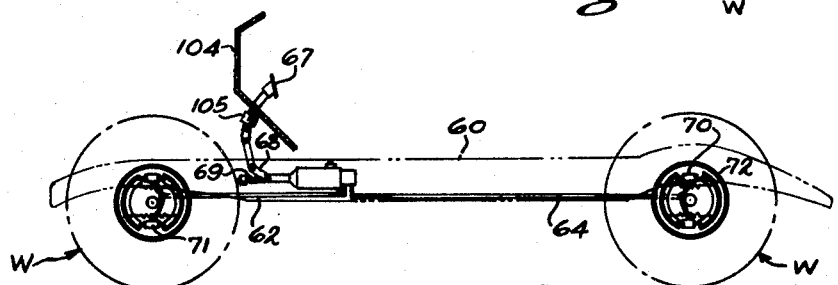
Fig. 5
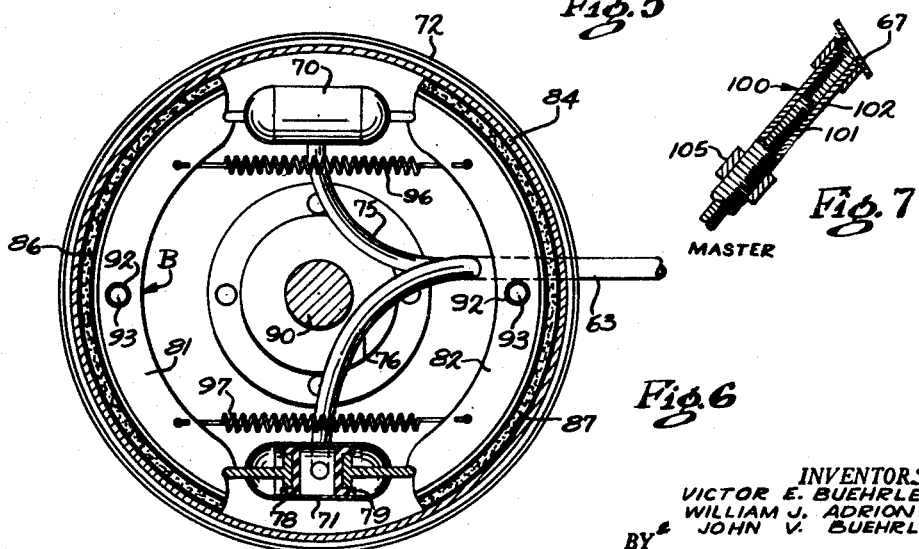
Fig. 7
Fig. 6
INVENTORS
VICTOR E. BUEHRLE, JR.,
WILLIAM J. ADRION
JOHN V. BUEHRLE
BY
RICHEY, WATTS, EDGERTON & McNENNY
ATTORNEYS United States Patent Office 2,909,250
Patented Oct. 20, 1959

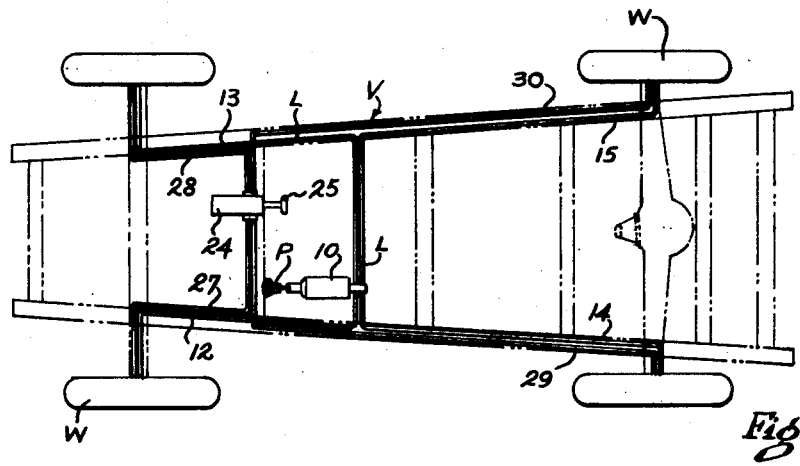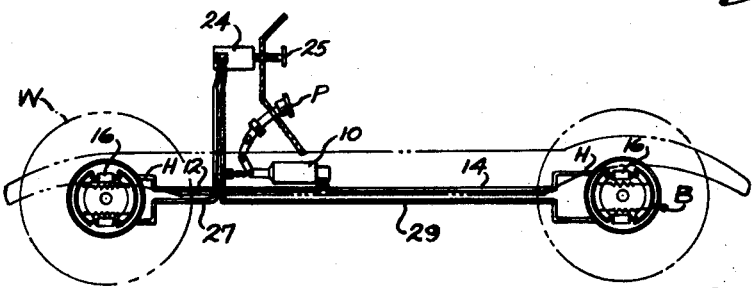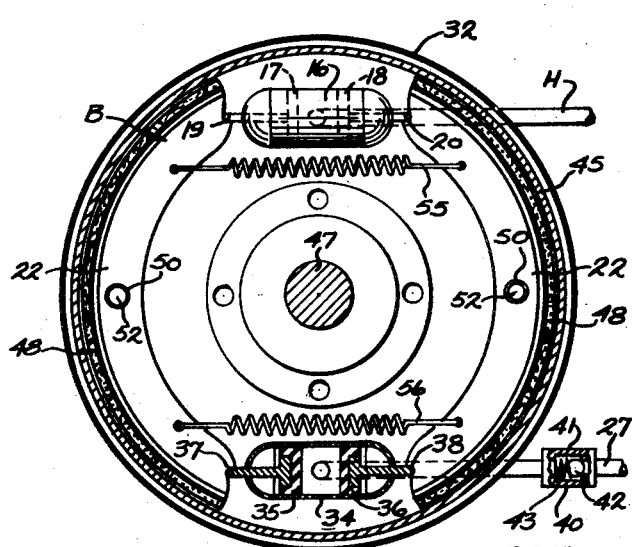

2,909,250
AUTOMOBILE BRAKE SLACK ADJUSTING APPARATUS

Victor E. Buehrle, Jr., William J. Adrion, and John V. Buehrle, Akron, Ohio; said Victor E. Buehrle, Jr., assignor of three-fortieths to Kathleen D. Romo and Melvin B. Romo, and one-twentieth to Marilyn Taylor and Floyd L. Taylor, all of Akron, Ohio Application March 4, 1955, Serial No. 492,148

1 Claim. (Cl. 188—196)

The present invention relates generally to the brake art and is more particularly concerned with a novel brake system in which the slack is automatically regulated by remote control and with a novel brake assembly for use in this system.

In the operation of any device incorporating a brake which involves frictional contact and wear of parts in its operation, it is essential to make adjustments periodically to reduce or eliminate slack developing in the brake system attributable to this wear. Thus, in the field of railway brakes, brake slack adjustors have reached a high degree of development and refinement, automatic operation and overriding remote control being features of standard equipment in use at the present time. However, in the automotive field, where brake units and apparatus are quite unlike those of the railway type, no such progress has heretofore been made. In fact, for lack of suitable means, it is necessary to dismantle the individual brake units to make the periodic adjustments required of brakes in modern automobiles. The demand for some means or method which will avoid this nuisance inherent in the operation of motor vehicles has a long history and is marked with a number of prior efforts and failures of others to devise a satisfactory solution to the problem.

Despite the long strides which have been taken and the many technological advances in the automotive field, both in styling and in purely mechanical phases of production and operation, at the present time, the large majority of modern automobiles do not even afford means whereby the brakes of the individual wheels can be adjusted without disassembly and the expenditure of considerable time and effort. A few automobiles have in the past been equipped with brake-adjusting means external of the brake drums enabling regulation or take-up of slack in the brakes from locations immediately adjacent to each of the said drums. While this arrangement spares the necessity for taking the brake units apart, it still does not constitute or closely approach a satisfactory solution to the problem because considerable effort must be spent to make the required adjustments at each separate wheel of the vehicle and because considerable skill is required to arrive at proper adjustment and balancing of all four brakes.

Other schemes which have been developed for the purpose of meeting this demand and solving this problem have not reached the commercial stage to the best of our knowledge, having failed for various reasons to respond to the fundamental requirements essential to the attainment of success. A most common cause for such failure has been the economic factor, the apparatuses heretofore developed being too expensive to manufacture, too difficult to install or presenting costly maintenance problems. As those skilled in the art know, anything which is to be added to a large volume production item, such as the American motor car, cannot possibly be a prospect for commercial success unless its cost is practically nominal and its incorporation in the vehicle adds almost nothing to the manufacturer's cost of production of the vehicle. The highest degree of invention, or in other words, the utmost in simplicity is therefore usually essential to commercial success in the automotive field.

Our present invention affords the art, for the first time, a solution to the problem and demand stated above, since it enables the realization of the objectives of the art in respect to automatic brake slack adjustment, while adding almost nothing to the cost of manufacturing the basic motor vehicle. Still further, this invention presents the art with equipment having substantial latitude and flexibility of form and organization as well as of operation. Another advantage of this invention is that the operator can, without either touching the brakes or leaving the driver's seat, make the required adjustments in the brakes. Still further, this adjustment can be made in all four wheels at once and by a single actuation or movement of a lever. As a further advantage, this invention enables the vehicle operator to maintain the brakes of his car in substantially perfect balance at all times simply by making occasional adjustments by means operated from the driver's seat.

Those skilled in the art will gain a further and better understanding of this invention and the objects and advantages thereof upon consideration of the detailed description of two embodiments of this invention set forth below, reference being had to the accompanying drawings forming a part of this specification, in which:

Fig. 1 is a semi-diagrammatic view in plan of a brake system of this invention in a preferred form;

Fig. 2 is an elevational view of the brake system in Fig. 1, indicating the details of the novel wheel brake subassembly of this invention;

Fig. 3 is an enlarged, transverse, sectional view of the said novel wheel brake assembly of this invention;

Fig. 4 is a view similar to Fig. 1 of another form of brake system of this invention;

Fig. 5 is a view similar to Fig. 2, showing the system of Fig. 4 in elevation;

Fig. 6 is an enlarged, transverse, sectional view of a wheel brake assembly, showing the unique relationship between the cylinders thereof and the slack adjuster and brake-actuating circuits; and Fig. 7 is an enlarged, fragmentary, longitudinal, sectional view of the pedal lever assembly shown in Fig. 5.

In general, an hydraulic brake system of this invention comprises brake shoes, a brake cylinder operatively associated with the shoes, and means for adjusting the brakes from a location remote from the shoes. This adjusting means includes a remote cylinder which is operatively connected to the brake cylinder and mechanical means for actuating the remote cylinder to take up slack in the brakes.

Also described in general terms, the wheel brake assembly of this invention comprises a brake housing, a pair of brake shoes in the housing mounted for motion relative to each other, means including a hydraulic cylinder connected to one end of each of said shoes for moving the shoes within the housing to operate the brakes, and a second hydraulic cylinder in the housing and operatively associated with the shoes to adjust the positions of the shoes relative to each other and regulate slack in the assembly, the second cylinder being connected to the other end of each of the shoes.

In the system illustrated in Fig. 1, brake slack adjustment and actuation of the brakes are accomplished through two entirely separate and independent hydraulic circuits. However, both of these circuits are operated from the driver's seat merely by manipulation of a lever or handle and by pushing a pedal.

Vehicle V of Fig. 1 is equipped in accordance with this invention with a hydraulic brake system including lines L and hoses H of generally conventional form by means of which the brakes B of each of the four wheels W of the vehicle are applied when pedal P of the system is depressed in the usual manner. Accordingly, this hydraulic brake system, in addition to pedal P, includes a master cylinder 10 with which the pedal is operatively associated by means of the usual linkage elements and spring means for restoring the pedal to its released position. Four separate lines 12, 13, 14 and 15 connect the master cylinder with the four separate wheel brake assemblies of the vehicle, being connected at their outer ends to the four brake cylinders 16. A pair of pistons 17, 18 are mounted in opposed relation in each cylinder 16 and are provided with piston rods 19, 20 extending through the opposite ends of the cylinder for engagement with the opposing end portions of brake shoes 22 so that the shoes are moved when the brake-actuating circuit is operated by pedal P.

The brake-adjusting circuit, as shown in Figs. 1 and 2, comprises a master cylinder 24 and actuating means therefor including a handle 25 which may be turned by the driver to apply pressure in the slack adjuster hydraulic system. Four separate hydraulic lines 27, 28, 29 and 30 lead from cylinder 24 to the four separate wheel assemblies and the outer or remote ends of these lines extend through the brake housings 32 and communicate with slack adjuster cylinder units 34 disposed therein. Cylinders 34 are essentially the same as cylinders 16 in that they contain opposed pistons 35, 36 having piston rods 37, 38 extending through the ends of the cylinders for engagement with opposed ends of brake shoes 22, as illustrated in Fig. 3. A check valve 40 is provided in each of the slack adjuster lines and comprises in each instance a body 41 in which is disposed a ball check 42 and a spring 43 to maintain the ball against the valve seat within the body and thus prevent the flow of hydraulic fluid from the cylinders 34 following each adjustment.

In a typical wheel assembly of this invention, as shown in Fig. 3, there are a pair of brake shoes 22 mounted within a housing 32 and within a brake drum 45 connected to axle 47 suitably in the conventional manner. Linings 48 are provided for the brake shoes for engagement with the drum when the brakes are operated. Cylinders 16 and 34 are, as indicated above, disposed respectively between the opposed upper and lower ends of the brake shoes. Brake shoes 22 are provided in their midsections with enlarged apertures 50 and the shoes are positioned with these apertures receiving locating pins 52 of reduced diameter extending through apertures 50 and preventing the shoes from flopping or wobbling within the housing. The assembly is completed with a pair of tension springs 55, 56 which are mounted parallel to and adjacent to cylinders 16 and 34, respectively, in order that the shoes are normally resiliently drawn away from the drum.

In the operation of the apparatus illustrated in Figs. 1-3, inclusive, it will be understood that with the brakes in adjustment the operator uses the brake system in the usual manner, operating pedal P whenever the brakes are to be applied. However, after a period of use, slack will develop in the system; and when it reaches the point that it is noticeable to the driver, he may correct the condition and bring the brakes back into adjustment by operating the brake slack adjuster component of the assembly. Thus, by turning handle 25, the operator causes each set of brake shoes of each wheel to move to take up brake slack. Check valves 40 allow pressure to be applied to opposed pistons 35, 36 and then check the release of that pressure automatically so that when the shoes are moved to the slack take-up position they are not permitted to return to their original position but are held in the new position and operated from there through subsequent actuations of the brake pedal and associated elements.

Vehicle 60 of Figs. 4 and 5 is equipped with hydraulic brake means comprising a master cylinder 61 and four separate hydraulic lines 62, 63, 64 and 65 leading respectively to the four wheels W of the vehicle. Cylinder 61 is operated by means of a pedal 67 and a link 68 in association with a spring 69 for resiliently maintaining pedal 67 in released position. The brakes are actually applied at each wheel by means of a pair of cylinders 70, 71 disposed within wheel housing 72. Each of the four brake lines is fitted at its remote end with a pair of hoses 75, 76 connected to cylinders 70, 71 to deliver hydraulic fluid into said cylinders and drive opposed pistons 78, 79 apart. Opposed shoes 81, 82 are thereby moved to brake drum 84 through linings 86, 87 to slow or stop rotation of axle 90.

A central transverse aperture 92 is provided in each brake shoe and a locating pin 93 of reduced diameter is disposed therethrough, the pin being connected to the housing and having the effect of preventing undesirable displacement of the shoes within the housing. A pair of tension springs 96, 97 are disposed adjacent to cylinders 70 and 71, respectively, and are in generally parallel relation thereto in order to resiliently draw the shoes away from engagement with the brake drum at all times.

In this system, slack in the brakes is compensated by means of the pedal assembly, adjustment in the effective length of the pedal lever being possible by virtue of the novel construction of this element. As shown in Fig. 7, the pedal lever comprises a threaded rod 101 telescopically received in an internally threaded sleeve 102. Pedal 67 is screwed onto the upper end of sleeve 102 where it projects through fire wall 104 (Fig. 5) and a collar 105 is disposed on the lower portion of the sleeve below the fire wall. By virtue of this construction and the relationship of these parts, and particularly the rod and sleeve members, slack is readily compensated simply by turning sleeve 102 to move rod 101 to elevate the pedal. Furthermore, this adjustment can be made from within the driver's compartment due to the accessibility of the adjusting parts.

Having thus described the present invention so that those skilled in the art may be able to understand and practice the same, we state that what we desire to secure by Letters Patent is defined in what is claimed.

What is claimed is:

In an automobile hydraulic brake system in combination, a brake master cylinder, a pair of brake shoes operatively associated with each wheel and connected to the master cylinder for operation thereby, a lever for actuating the master cylinder having an exteriorly threaded end, and brake slack compensating means comprising an interiorly threaded sleeve having adjustable screw threaded engagement with the threaded end of said lever, said sleeve being positioned to extend into the driver's compartment of an automobile and having exterior threads on the end opposite to said lever, and a foot pedal having screw threaded engagement with said exterior threads.

References Cited in the file of this patent

UNITED STATES PATENTS

| | | |
|---|---|---|
| 1,724,292 | Lawrence | Aug. 13, 1929 |
| 1,830,306 | Wemp | Nov. 3, 1931 |
| 2,048,472 | Sanford | July 21, 1936 |
| 2,064,617 | La Brie | Dec. 15, 1936 |
| 2,077,939 | La Brie | Apr. 20, 1937 |
| 2,140,752 | La Brie | Dec. 20, 1938 |
| 2,547,593 | Morris | Apr. 3, 1951 |
| 2,585,474 | Kramar | Feb. 12, 1952 |
| 2,619,203 | Shaw | Nov. 25, 1952 |